United States Patent [19]

Kuroda

[11] Patent Number: 4,729,041
[45] Date of Patent: Mar. 1, 1988

[54] INFORMATION REPRODUCING DEVICE WITH DYNAMIC DROP-OUT COMPENSATION INHIBITING MEANS

[75] Inventor: Kazuo Kuroda, Tokorozawa, Japan

[73] Assignee: Pioneer Electronic Corporation, Japan

[21] Appl. No.: 722,203

[22] Filed: Apr. 11, 1985

[30] Foreign Application Priority Data

Apr. 11, 1984 [JP] Japan .................. 59-052012[U]

[51] Int. Cl.⁴ .................................. H04N 5/76
[52] U.S. Cl. ........................ 358/336; 358/342; 358/341; 358/343; 360/38.1
[58] Field of Search ............ 358/339, 335, 336, 340, 358/342, 341, 343; 360/38.1

[56] References Cited

U.S. PATENT DOCUMENTS 4,523,304 6/1985 Satoh et al. .................. 358/342 X
4,535,366 8/1985 Pullen .................. 358/342

Primary Examiner—Robert L. Richardson
Attorney, Agent, or Firm—Lowe, Price, LeBlanc, Becker & Shur

[57] ABSTRACT

An information reproducing device for reproducing a computer program digital data information contained in audio band signals of a video disk and capable of preventing phase disturbance of the digital data information and deterioration of the data reading capacity. The device comprises detecting means for detecting presence of the digital data information including binary signals contained in reproduced audio band signals, and control means for controlling operations of a drop-out compensating circuit in an audio signal reproducing circuit in response to an output of the detecting means when the presence of such digital data information is detected by the detecting means.

10 Claims, 12 Drawing Figures

INFORMATION REPRODUCING DEVICE WITH DYNAMIC DROP-OUT COMPENSATION INHIBITING MEANS

BACKGROUND OF THE INVENTION

This invention relates to an information reproducing device for reproducing data information contained in audio band signals of a video disk, and more pareticularly to an information reproducing device for reproducing a modulated video band signal and a modulated audio band signal recorded on a video disk, said modulated audio band signal containing digital information including a computer program.

A video disk has recorded thereon FM moduldated video signals and one or more FM modulated audio band signals as well as data information.

A conventional video disk reproducing device is illustrated in FIG. 1. Video signals and audio band signals recorded on a video disk 1 are converted into electric signals after being picked up by means of pickup 2 and then amplified by preamplifier 3. The video signals are then supplied to and demodulated by video demodulator 4, thus forming a video signal reproducing circuit. Meanwhile, the two audio band signals amplified and FM modulated by preamplifier 3 are supplied to and demodulated by an audio first channel demodulator 7 and an audio second channel demodulator 10, thus forming audio signal reproducing circuits. Drop-outs are detected at drop-out detecting circuits 8 and 11 respectively connected to said demodulators 7 and 10 and are compensated for by preholding or the like at drop-out compensating circuits 9 and 12 respectively connected to said demodualtors 7 and 10 and said drop-out detecting circuits 8 ad 11. The first and second channel audio band signals for which drop-outs have been compensated are then outputted from switch 13 which switched among a stereo mode, a first channel monaural mode, a second channel monaural mode, and so on. The second channel signals are supplied to microprocessor 6 of a reproducing system.

Meanwhile, data included in the video signals modulated by the video demodulator 4 are read by a data reader 5 and fed to the microprocessor 6. The audio band signals may sometimes contain, in addition to voices, digital data information such as a production program for a reproducing system indicated by binary high and low signals, a program for activating any other device such as, for example, a personal computer 14, and so on.

Generally, the FSK modulating system wherein data are transmitted by phase information of rectangular waves having high and low levels is employed for such digital data information. After such data are inputted to and stored in the microprocessor 6 of the reproducer, the reproducing system operates in accordance with a program of the digital data information.

On the other hand, where the output is supplied to the personal computer 14, the digital data information recorded on the video disk are fed to the personal computer 14 as described hereinabove. For example, a program of a game program or the like can be transmitted by such digital data information.

In the information reproducing device which reproduces a video disk which has such digital data information additionally recorded thereon as described above, the drop-out detection sensitivity is very high since it is adjusted for average audio signals, and hence drop-out compensation is performed even when there is a low level of drop-outs in comparison with the digital data information of a high level while a difference between high and low levels is constant. As a result, the traditional information reproducing device has a drawback that the phase of the digital data information is disturbed by such drop-out compensation, resulting in deterioration of a data reading faculty of a microprocessor 6.

FIGS. 2A, 2B and 2C illustrate examples of outputs from audio second channel demodulator 10, the dropout detecting circuit 11 and the drop-out compensating circuit 12 of FIG. 1, respectively.

SUMMARY OF THE INVENTION

The present invention has been made in view of the above, and it is an object of the invention to provide an information reproducing device which eliminates such a drawback as described above by changing a limited number or duration of drop-out compensation where the digital data information is included in audio band signals.

According to the present invention, there is provided an information reproducing device for reproducing modulated video band signals and modulated audio band signals recorded on a video disk. The modulated video band signals include a video signal and the modulated audio band signals include an audio signal and digital data information including a computor The information reproducing device comprises a video signal reproducing circuit and an audio signal reproducing circuit; a demodulator provided in the audio signal reproducing circuit; a drop-out detecting circuit connected to the demodulator; a drop-out compensating circuit connected to the demodulator and the drop-out detecting circuit; with a selected one of the modulated video band signals and the modulated audio band signal including a discrimination signal to recognize the digital data information; and; control means for restraining operations of the drop-out compensating circuit in response to the discrimination signal.

DETAILED DESCRIPTION OF THE EMBODIMENTS

Figure 1:
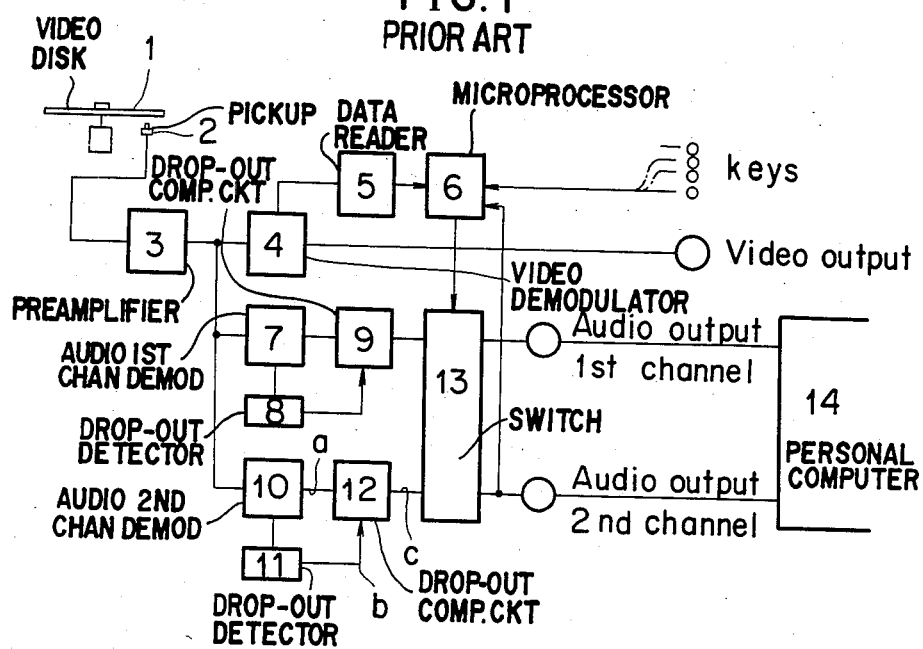
FIG. 1 is a block diagram of one of conventional information reproducing devices.
Figure 2:
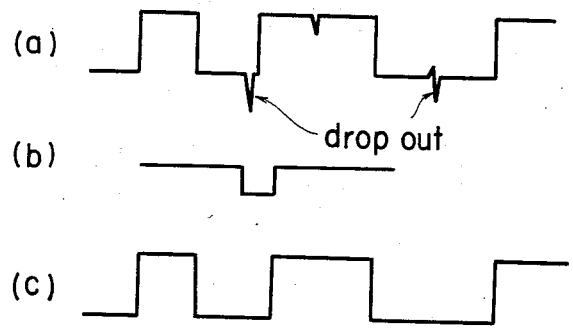
FIGS. 2A to 2C are diagrams illustrating waveforms at different portions of the information reproducing device of FIG. 1.
Figure 3:
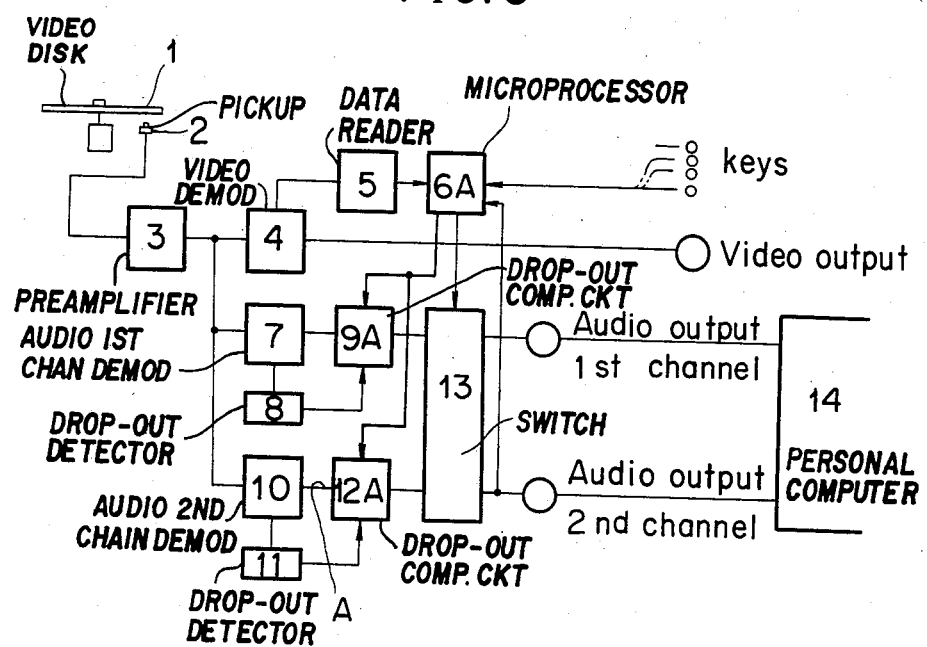
FIG. 3 is a block diagram illustrating an embodiment of the present invention.

Referring first to a block diagram of FIG. 3 which illustrates an embodiment of the present invention, like parts or components are designated by like reference numerals to those of the conventional device illustrated in FIG. 1, and description of the same is omitted herein.

A microprocessor 6A provided in the video signal reproducing circuit, in place of the microprocessor 6 of FIG. 1, detects control data contained in the FM modulated video band signal and representative of the presence of the digital data information if said digital data information is included in the audio band signals currently being reproduced. The detection output is supplied to drop-out compensating circuits 9A and 12A to control the operation of the dropout compensating circuits 9A and 12A.

Figure 4:
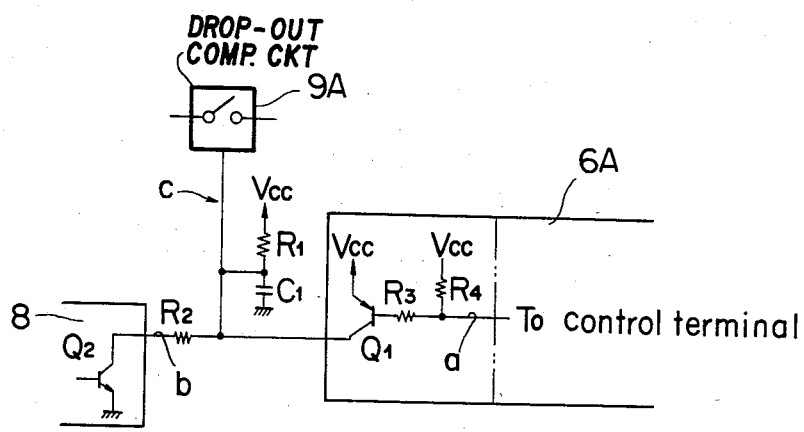
FIG. 4 is a circuit diagram illustrating a specific example of the above embodiment.

In particular, the embodiment is illustrated in FIG. 4.

A transistor Q1 and resistors R3 and R4 constitute a peripheral circuit around the microprocessor 6A, and the aforementioned detection signal of the microprocessor 6A is supplied to a base of the transistor Q1 via the resistor R3. It is to be noted that the resistors R3 and R4 each provide a bias. A collector output of output transistor Q2 of the drop-out detecting circuit 8 is supplied as a drop-out detection output to the drop-out compensating circuit 9A via a resistor R2. A pulse width setting means including resistor R1 and capacitor C1 is connected to the drop-out compensating circuit 9A. The collector of the transistor Q1 is connected to the collector of the transistor Q2 via the resistor R2 so as to control application of the drop-out detection signal to the drop-out compensating circuit 9A in response to an output of the transistor Q1.

In the embodiment of the invention having such a construction as described above, a type of the video disk, an address under reproduction, a manner in which voices are to be processed, and so on, are included in predetermined respective portions of the video signals recorded on the video disk. A discrimination code is also included in the video signal for discriminating if the audio band signal under reproduction represents data information Such a discrimination code is used to determine if microprocessor 6A takes in signals of the audio output. In an embodiment of the invention, such a discrimination code is used to inhibit drop-out compensation when an audio band signal contains digital data information.

Figure 5:
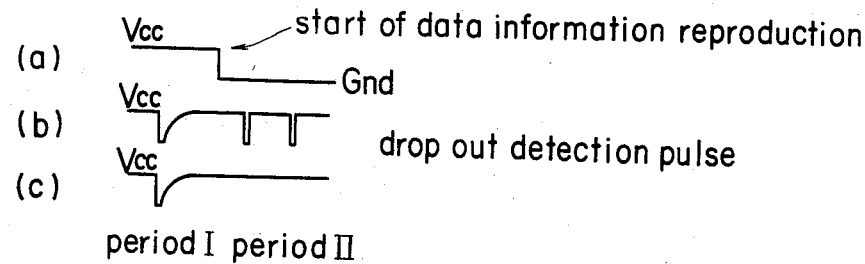
FIGS. 5a to 5c are diagram illustrating waveforms upon operation of the embodiment of the invention.

Now, referring to FIG. 5a, section I in each waveform corresponds to a section where no digital data information is present in the audio band signal. Section II corresponds to a section where digital data information is present therein.

If the drop-out detecting circuit 8 operates, transistor Q2 is turned on and the waveform at the output terminal b of transistor Q2 becomes such as illustrated in FIG. 5b. Meanwhile, FIG. 5a illustrates a signal a supplied to the base of the transistor Q1 from microprocessor 6A.

At section I, the signal a holds a high level so that the transistor Q1 is maintained in the off condition. Thus, when the drop-out is detected as shown by the first negative pulse of FIG. 5b, the pulse width of a drop-out detection pulse supplied to the drop-out compensating circuit 9A is substantially determined by a resistance of the resistor R1 and a capacity of the capacity C1 (R1>>R2) so that the drop-out detection pulse has a substantially same waveform with the first negative pulse of FIG. 5b, as seen in FIG. 5c.

Meanwhile, at section II, the transistor Q1 is maintained on so that a drop-out detection signal supplied to the collector of transistor Q1 and to drop-out compensating circuit 9A is clamped substantially to the voltage Vcc of the power source as seen in FIG. 5c. Hence, drop-out compensation is not accomplished even if a drop-out is detected as shown in FIG. 5b.

Accordingly, there occurs no phase deviation of data information which may otherwise occur when drop-out compensation is accomplished.

Generally, while most of noise arising from a dropout of audio band signals of a video disk present 20 to 40 dB relative to a peak value of 100% modulated signals, since a dynamic range of audio signals is very wide, the sensitivity of the drop-out detection circuits 8 and 9 is raised accordingly. However, since high and low signal levels of the digital data information are near to those of substantially 100% modulated signals, possible noise arising from a drop-out will seldom cause a misoperation.

Figure 6:
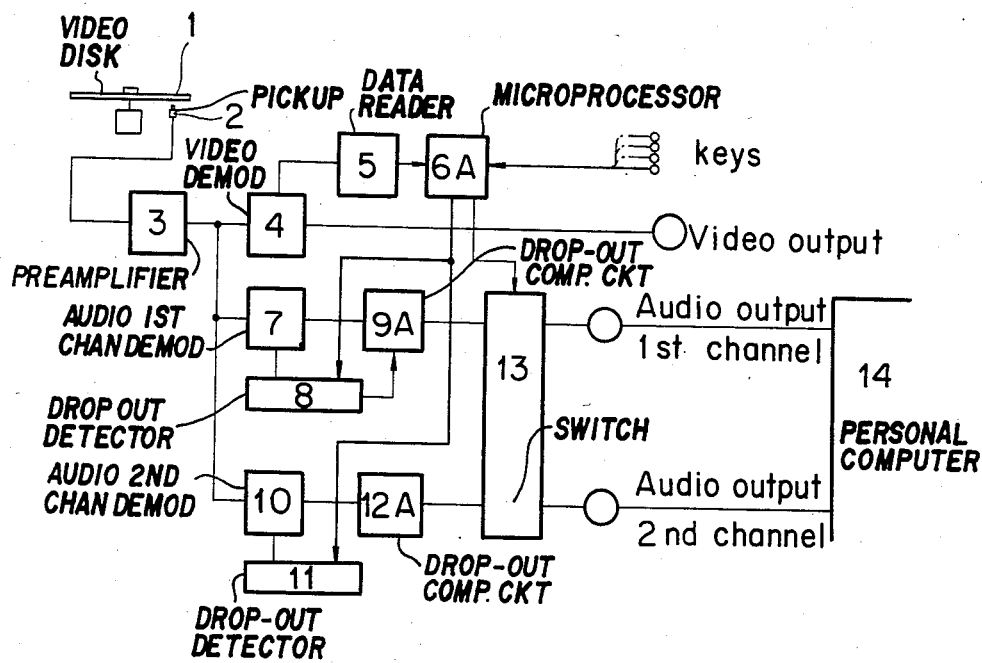
FIGS. 6, 7 and 8 are block diagram illustrating first, second and third modified forms of the present invention.

It is to be noted that while in the description above a situation is illustrated wherein drop-out compensation is not performed within a section having the digital data information contained therein, it may be modified as illustrated in FIG. 6. Thus, when the control data contained in the FM modulated video band signal and representative of the digital data information is detected by the microprocessor 6A, the drop-out detecting circuits 8 and 11 are controlled and its drop-out sensing levels are lowered to reduce the frequency of drop-out compensation.

Figure 7:
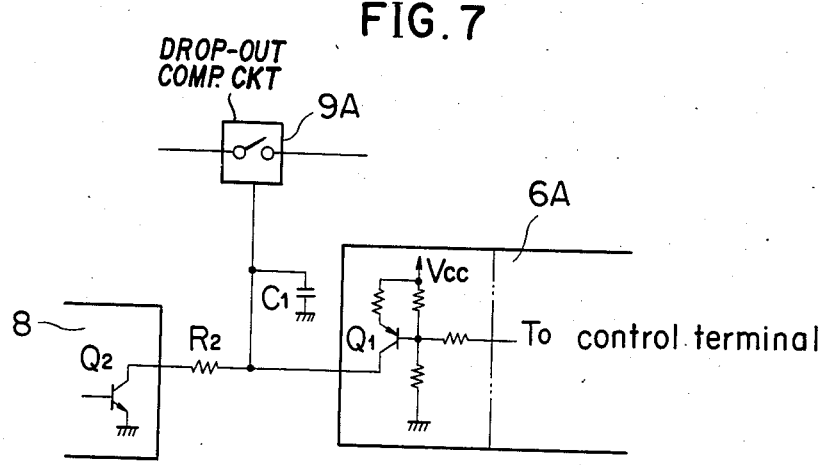

Also, such modification as illustrated in FIG. 7 may be possible wherein the transistor Q1 is constituted as a constant current source so as to allow an electric current to vary in response to an output of the microprocessor 6A when presence of the digital data information is detected, to shorten the operation period of dropout compensation. In this embodiment, the microprocessor 6A controls the drop-out compensating circuits 9A and 12A as shown in FIG. 3.

Figure 8:
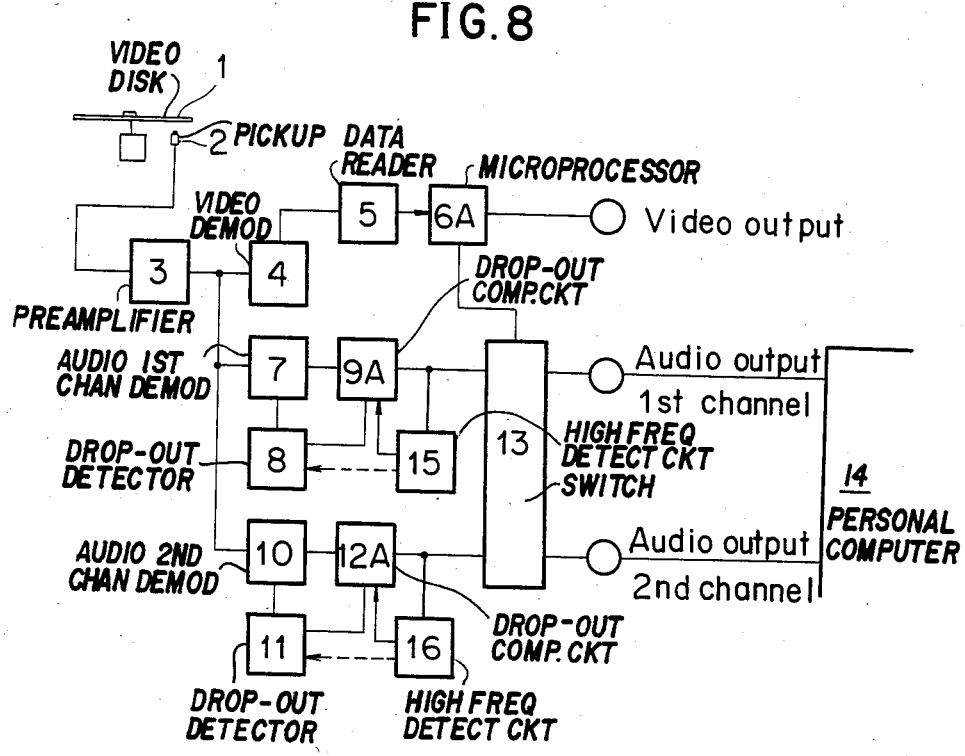

Further, another modification as illustrated in FIG. 8 may also be possible wherein a first channel high frequency detecting circuit 15 and a second channel high frequency detecting circuit 16 are provided. The respective outputs of detecting circuits 15 and 16 are coupled to drop-out compensating circuits 9A and 12A so as to either inhibit operations of the drop-out compensating circuits 9A and 12A or shorten the frequency or period of copensation as shown in solid lines. In these embodiments, control data are contained in the modulated audio band signals in digital form to be detected by circuits 15 and 16. A further modification is also possible wherein high frequency components are contained in high and low signals of the digital data information when a high frequency signal is detected by the high frequency circuit 15 or 16 in order to control operations of the drop-out compensating circuits 9A and 12A as shown in dotted lines within a section in which the digital data information is present without making use of a code in video signals.

A specific method of containing high frequency components in high and low signals of the digital data information may possibly be to raise the frequency of the digital data information or to put high frequency components on signals of the digital data information.

As apparent from the foregoing description, according to the present invention, in the situation where digital data information is included in audio band signals, the presence of such digital data information is detected to control drop-out compensating operations. As a result, disturbance of the phase of the digital data information by drop-out compensation and deterioration of the data reading capacity are essentially prevented.

What is claimed is:

1. An information reproducing device for reproducing modulated video band signals and modulated audio band signals recorded on a video disk, said modulated video band signals including a video signal, said modulated audio band signals including an audio signal and digital data information, said information reproducing device comprising
   a video signal reproducing circuit and an audio signal reproducing circuit;
   a demodulator provided in said audio signal reproducing circuit;
   a drop-out detecting circuit connected to said demodulator;
   a drop-out compensating circuit connected to said demodulator and said drop-out detecting circuit;
   selected one of said modulated video band signals and said modulated audio band signal including a discrimination signal to recognize said digital data information; and
   control means for restraining operations of said drop-out compensating circuit in response to said discrimination signal.

2. An information reproducing device according to claim 1, wherein said control means includes a microprocessor provided in the video signal reproducing circuit, said modulated video band signals including said discriminating signal, said microprocessor being fed with the discriminating signal.

3. An information reproducing device according to claim 2, wherein said microprocessor is adapted to control the drop-out compensating circuit such that the operation of the drop-out compensating circuit is inhibited.

4. An information reproducing device according to claim 2, wherein said microprocessor is adapted to control the drop-out detecting circuit such that drop-out sensing level of the drop-out detecting circuit is lowered.

5. An information recording device according to claim 2, wherein said microprocessor is adapted to control the drop-out compensating circuit such that the operation period of the drop-out compensating circuit is shortened.

6. An information recording device according to claim 1, wherein said control means includes a high frequency detecting circuit connected to an output side of said demodulator to operate in accordance with said discrimination signal representative of the presence of the digital information, said modulated audio band signals including the discrimination signal in digital form.

7. An information recording device according to claim 6, wherein said high frequency detecting circuit is adapted to control the drop-out compensating circuit such that the operation of the drop-out compensating circuit is inhibited.

8. An information recording device according to claim 6, wherein said high frequency circuit is adapted to control the drop-out detecting circuit such that the sensing level of the drop-out sensing circuit is lowered.

9. An information recording device according to claim 6, wherein said high frequency circuit is adapted to control the drop-out compensating circuit such that the operation period of the drop-out compensating circuit is shortened.

10. In a device for reproducing frequency multiplex recorded signals in a video disk in which said signals include modulated video band signals and modulated audio band signals including audio signals and digital data signals, said device having means for compensating for any possible drop-outs in reproduced modulated audio band signals, the improvement comprising means for recognizing the digital data signals in said audio band signals and means for restraining said drop-out compensation action upon recognition of said digital data signals.

* * * * *